(12) United States Patent
Ran et al.

(10) Patent No.: US 10,668,517 B2
(45) Date of Patent: Jun. 2, 2020

(54) METAL SHELL OF ELECTRONIC DEVICE AND METHOD FOR FABRICATING SAME

(71) Applicant: Beijing Xiaomi Mobile Software Co., Ltd., Beijing (CN)

(72) Inventors: Jianbo Ran, Beijing (CN); Duo Xu, Beijing (CN); Youfu Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 144 days.

(21) Appl. No.: 15/718,736

(22) Filed: Sep. 28, 2017

(65) Prior Publication Data
US 2018/0093312 A1    Apr. 5, 2018

(30) Foreign Application Priority Data
Sep. 30, 2016   (WO) ............... PCT/CN2016/101060

(51) Int. Cl.
*B21D 22/02*    (2006.01)
*H04M 1/02*    (2006.01)
(Continued)

(52) U.S. Cl.
CPC ............ *B21D 22/02* (2013.01); *B23C 3/12* (2013.01); *B29C 45/14221* (2013.01);
(Continued)

(58) Field of Classification Search
CPC .. H04M 1/0202; H04M 1/026; H04M 1/0274; H04M 1/0283; B21D 51/32;
(Continued)

(56) References Cited

U.S. PATENT DOCUMENTS 5,531,950 A * 7/1996 Kimura ............... B29C 37/0078
264/135
2009/0323263 A1* 12/2009 Hsu .................. H05K 5/04
361/679.01
(Continued)

FOREIGN PATENT DOCUMENTS

CN    103008417 A    4/2013
CN    104468885 A    3/2015
(Continued)

OTHER PUBLICATIONS

Machine Translation of EP0373527 A2, (Year: 1990).*
(Continued)

*Primary Examiner* — Adrian S Wilson
(74) *Attorney, Agent, or Firm* — Finnegan, Henderson, Farabow, Garrett & Dunner, L.L.P.

(57) ABSTRACT

A metal shell of an electronic device and a method for fabricating the metal shell are provided. The method for fabricating the metal shell includes: stamping out a side wall and a bottom portion of the metal shell from a metal sheet, wherein the stamping retains a reserved material at a first position on the side wall; bending and shoving the reserved material on the side wall towards an inner side of the side wall, until a protruding portion is formed at the inner side of the side wall; removing an excessive portion of the protruding portion to shape the protruding portion into a plastic gripping structure of a preset shape; and injecting and filling the plastic gripping structure with plastic.

18 Claims, 15 Drawing Sheets

(51) Int. Cl.
  *B29C 45/14*    (2006.01)
  *B23C 3/12*     (2006.01)
  *G06F 1/16*     (2006.01)
  *B29K 705/00*   (2006.01)
  *B29L 31/34*    (2006.01)

(52) U.S. Cl.
  CPC ...... *B29C 45/14311* (2013.01); *G06F 1/1613* (2013.01); *H04M 1/0202* (2013.01); *B29K 2705/00* (2013.01); *B29L 2031/3481* (2013.01)

(58) Field of Classification Search
  CPC ................ B23C 3/12; B29C 45/14221; B29C 45/14311; B29C 45/00; B21R 22/02; G06F 1/1613
  See application file for complete search history.

(56) References Cited

U.S. PATENT DOCUMENTS

| | | | | |
|---|---|---|---|---|
| 2011/0165366 A1* | 7/2011 | Wang | ................ | B29C 45/14311 428/68 |
| 2013/0328730 A1* | 12/2013 | Guterman | ............... | B29C 33/76 343/702 |
| 2016/0088131 A1* | 3/2016 | Chiu | .................... | H04M 1/026 455/575.8 |
| 2016/0116948 A1* | 4/2016 | Ou | ........................ | G06F 1/1698 361/679.56 |
| 2016/0181688 A1* | 6/2016 | Gu | ......................... | H01Q 1/243 343/702 |
| 2016/0224075 A1* | 8/2016 | Chen | .................... | G06F 1/1656 |
| 2017/0194709 A1* | 7/2017 | Jansson | .................. | H01Q 7/00 |

FOREIGN PATENT DOCUMENTS

| | | | | |
|---|---|---|---|---|
| CN | 105643214 A | | 6/2016 | |
| EP | 0373527 A2 | * | 6/1990 | ........... E04B 1/8218 |

OTHER PUBLICATIONS

English version of International Search Report issued by the State Intellectual Property Office of the P.R. China dated May 31, 2017, in counterpart International Application No. PCT/CN2016/101060.

\* cited by examiner

200

```
┌─────────────────────────────────────────────────┐
│ Placing Position Limiting Device on Bottom Portion of │
│   Metal Shell, Position of Position Limiting Device   │──201
│ Corresponding to Position of Reserved Material on Side │
│                 Wall of Metal Shell                 │
└─────────────────────────────────────────────────┘
                        │
                        ▼
┌─────────────────────────────────────────────────┐
│   Bending and Shoving Reserved Material on Side Wall │
│ Towards Inner Side of Side Wall, Until Protruding Portion Is │──202
│          Formed at Inner Side of Side Wall          │
└─────────────────────────────────────────────────┘
                        │
                        ▼
┌─────────────────────────────────────────────────┐
│  Setting Protruding Portion Against Top Surface of Position │
│    Limiting Device so as to Limit Position of Protruding    │──203
│     Portion, and Removing Position Limiting Device from     │
│               Bottom Portion of Metal Shell                │
└─────────────────────────────────────────────────┘
```

Using Computerized Numerical Control Machine to Mill Out Plastic Gripping Structure from Protruding Portion, According to Preset Shape of Plastic Gripping Structure ~ 301

↓

Using T-Shaped Cutter to Cut Single-Piece Plastic Gripping Structure into Two or More Secondary Plastic Gripping Structures, and to Mill out Hollow Structure Between Every Two Adjacent Secondary Plastic Gripping Structures ~ 302

FIG. 3A

METAL SHELL OF ELECTRONIC DEVICE AND METHOD FOR FABRICATING SAME

CROSS-REFERENCE TO RELATED APPLICATIONS

This application is based upon and claims priority to International Application No. PCT/CN2016/101060, filed Sep. 30, 2016, the entire contents of which are incorporated herein by reference.

TECHNICAL FIELD

The present disclosure generally relates to the technology field of electronic device and, more particularly, to a metal shell of an electronic device and a method for fabricating the metal shell.

BACKGROUND

In order to create satisfactory tactile and visual experiences for users, more and more smartphones use metal shells. In the related art, an integral phone-body-forming process, also known as unibody process, is used to forge a single piece of metal into a metal shell of a basic shape, and then a large amount of work is needed to forge and process the metal shell into a specific shape through computerized numerical control (CNC) machines. Typically, after being forged, the metal shell needs to include one or more plastic gripping structures, such that the metal shell can be fixed to the smartphone through the plastic gripping structures. As such, the required thickness of the metal material depends on the thickness of the plastic gripping structures. That is, the thickness of the metal material needs to be greater than the thickness of the plastic gripping structures, to ensure the metal shell can be fabricated from the metal material. For example, if a metal shell has a side wall of 0.9 mm thick and a plastic gripping structure of 1.5 mm thick, the thickness of the metal material used for fabricating the metal shell is required to be at least 2 mm such a great thickness prolongs the time for a CNC machine to processing and forging the metal material, and increases the difficulty of performing stamping operation on the metal material.

SUMMARY

According to a first aspect of the present disclosure, there is provided a method for fabricating a metal shell, comprising: stamping out a side wall and a bottom portion of the metal shell from a metal sheet, wherein the stamping retains a reserved material at a first position on the side wall; bending and shoving the reserved material on the side wall towards an inner side of the side wall, until a protruding portion is formed at the inner side of the side wall; removing an excessive portion of the protruding portion to shape the protruding portion into a plastic gripping structure of a preset shape; and injecting and filling the plastic gripping structure with plastic.

According to a second aspect of the present disclosure, there is provided a metal shell, comprising: a side wall; a bottom portion; and a plastic gripping structure of a preset shape, the plastic gripping structure being is disposed on the side wall, wherein the plastic gripping structure is formed by a method comprising: stamping out the side wall and bottom portion of the metal shell from a metal sheet, wherein the stamping retains a reserved material at a first position on the side wall; bending and shoving the reserved material on the side wall towards an inner side of the side wall, until a protruding portion is formed at the inner side of the side wall; removing an excessive portion of the protruding portion to shape the protruding portion into the plastic gripping structure; and injecting and covering the plastic gripping structure with plastic.

According to a third aspect of the present disclosure, there is provided an electronic device, comprising: a processor; a memory for storing instructions executable by the processor; and a metal shell configured to house the processor and memory, the metal shell comprising: a side wall; a bottom portion; and a plastic gripping structure of a preset shape, the plastic gripping structure being is disposed on the side wall, wherein the plastic gripping structure is formed by a method comprising: stamping out the side wall and bottom portion of the metal shell from a metal sheet, wherein the stamping retains a reserved material at a first position on the side wall; bending and shoving the reserved material on the side wall towards an inner side of the side wall, until a protruding portion is formed at the inner side of the side wall; removing an excessive portion of the protruding portion to shape the protruding portion into an plastic gripping structure; and covering the plastic gripping structure with plastic.

It is to be understood that both the foregoing general description and the following detailed description are exemplary and explanatory only and are not restrictive of the invention, as claimed.

BRIEF DESCRIPTION OF THE DRAWINGS

FIG. 2 is a flowchart of a method for fabricating a metal shell, according to an exemplary embodiment.

FIG. 3A is a flowchart of a method for fabricating a metal shell, according to an exemplary embodiment.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
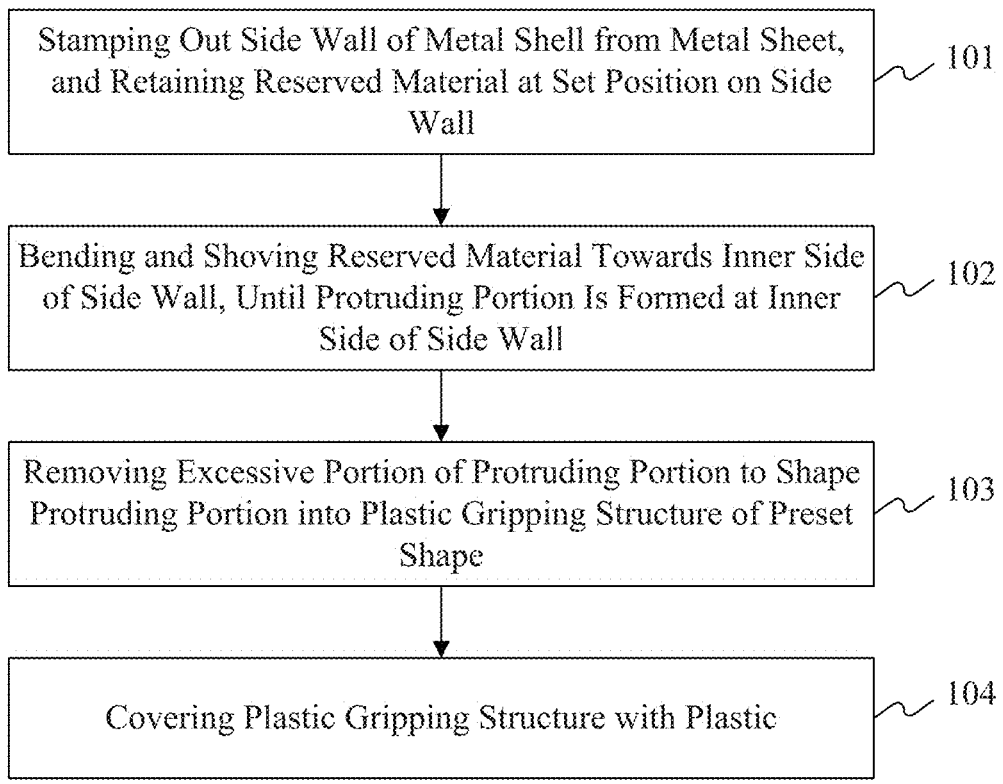
FIG. 1A is a flowchart of a method for fabricating a metal shell, according to an exemplary embodiment.

FIG. 1A is a flowchart of a method 100 for fabricating a metal shell, according to an exemplary embodiment. Consistent with the disclosed embodiments, the metal shell fabricated by the method 100 may be used as a shell of an electronic device, such as smart phones, tablets, personal computers, and the like. Referring to FIG. 1A, the method 100 includes the following steps 101-104.

In step 101, a side wall of the metal shell is stamped out from a metal sheet, and reserved materials are retained at one or more set positions on the side wall.

In exemplary embodiments, in order to save the time for performing metal stamping on the metal sheet and reduce the complexity of the metal stamping, the metal sheet used in the method 100 may be a thin sheet, such as a 0.9 mm-thick sheet. Nevertheless, the present disclosure does not limit the specific thickness of the metal sheet.

Figure 1B:
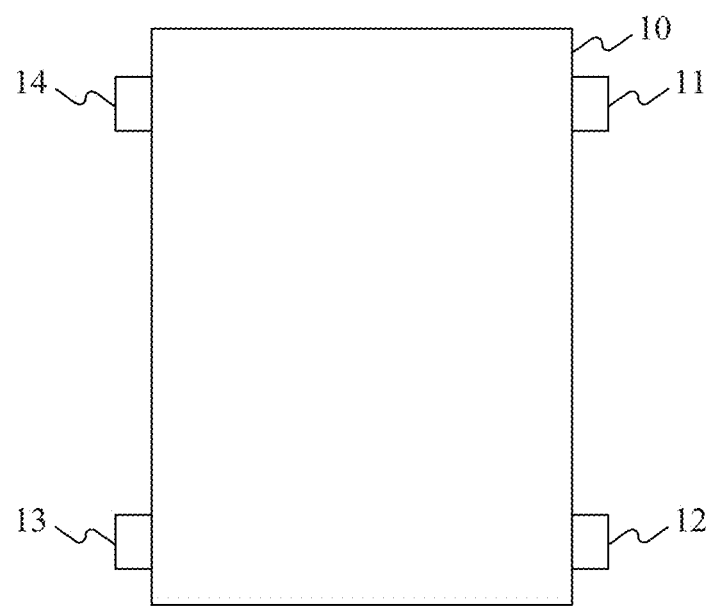
FIG. 1B is a schematic diagram illustrating a top view of a metal sheet used by the method of FIG. 1A to fabricate a metal shell, according to an exemplary embodiment.

FIG. 1B is a top view of a metal sheet 10 used in the method 100 to fabricate the metal shell. As shown in FIG. 1B, to reserved material 11, a reserved material 12, a reserved material 13, and a reserved material 14 are provided at set positions on the edges of the metal sheet 10. As described above, the metal shell is used as a shell of an electronic device. The reserved materials 11-14 may be used for creating, on the metal shell, slots required by the electronic device. As such, the set positions of the reserved materials 11-14 may correspond to slots required by the electronic device. The reserved materials 11-14 have sizes that enable reserved materials 11-14 to overlay the corresponding slots. As an example, the slots may include an antenna slot. The present disclosure does not limit the specific functions of the slots. Moreover, any grooves on the metal shell which could be used for containing certain components (e.g., circuits) of the electronic device may be deemed as the slots corresponding to the reserve materials described in the present disclosure.

Figure 1C:
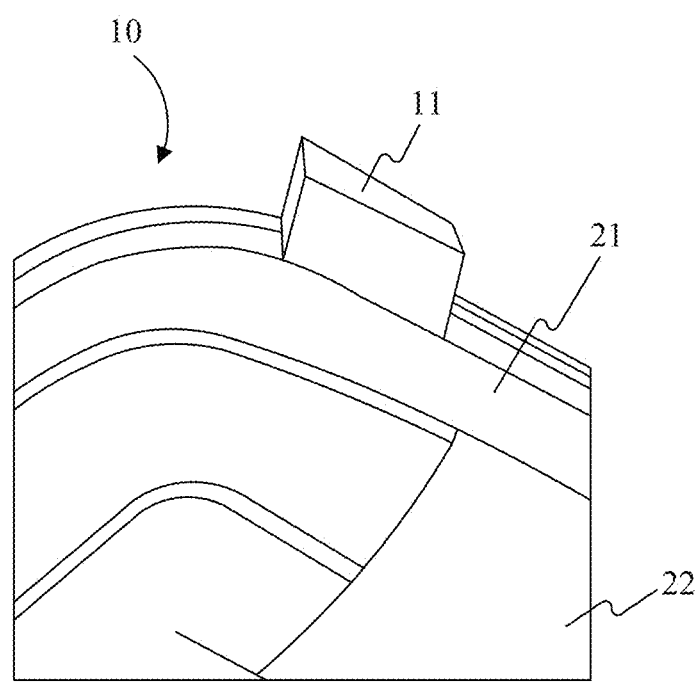
FIG. 1C is a schematic diagram illustrating a partial view of a side wall of the metal shell fabricated by the method of FIG. 1A, according to an exemplary embodiment.

FIG. 1C is a schematic diagram illustrating a partial view of the side wall of the metal shell formed in step 101, according to an exemplary embodiment. As shown in FIG. 1C, during the metal stamping, a side wall 21 and a bottom portion 22 of the metal sheet are stamped out from the metal sheet 10. After the metal stamping, the reserved materials 11-14 are disposed upright on the side wall 21 and extend along the side wall 21 in a direction parallel to the bottom portion 22. FIG. 1C shows the reserved material 11 as an example to illustrate the positions and shapes of the reserved materials. The positions and shapes of other reserved materials, such reserved materials 12-14, may be referred to the positions and shapes of the reserved material 11.

In step 102, the reserved material on the side wall is bent and shoved towards an inner side of the side wall, until a protruding portion is formed at the inner side of the side wall.

Figure 1D:
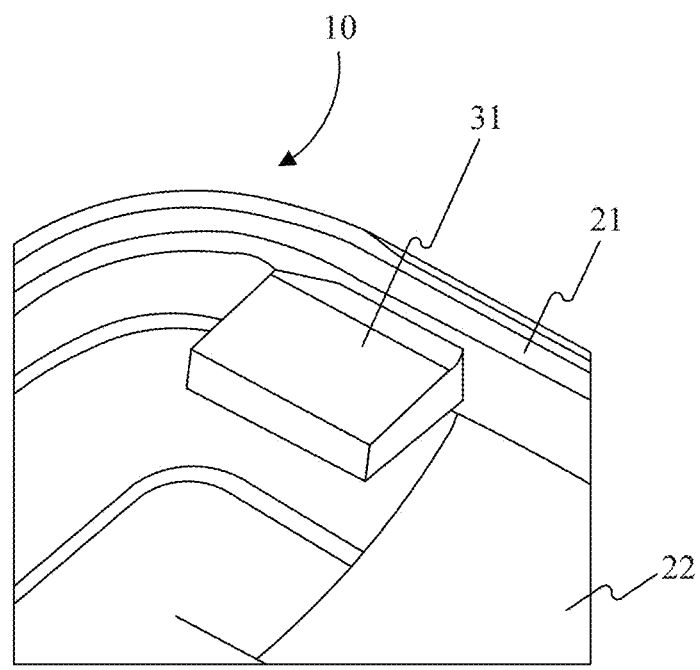
FIG. 1D is a schematic diagram illustrating a protruding portion formed by the method of FIG. 1A, according to an exemplary embodiment.

FIG. 1D is a schematic diagram illustrating a protruding portion formed in step 102, according to an exemplary embodiment. As shown in FIG. 1D, through bending and shoving, an external force is created to squeeze the reserved material 11 and the side wall 21, such that a protruding portion 31 is formed on the inner side of the side wall 21.

In step 103, an excessive portion of the protruding portion is removed from the protruding portion, to shape the protruding portion into a plastic gripping structure of a preset shape.

Figure 1E:
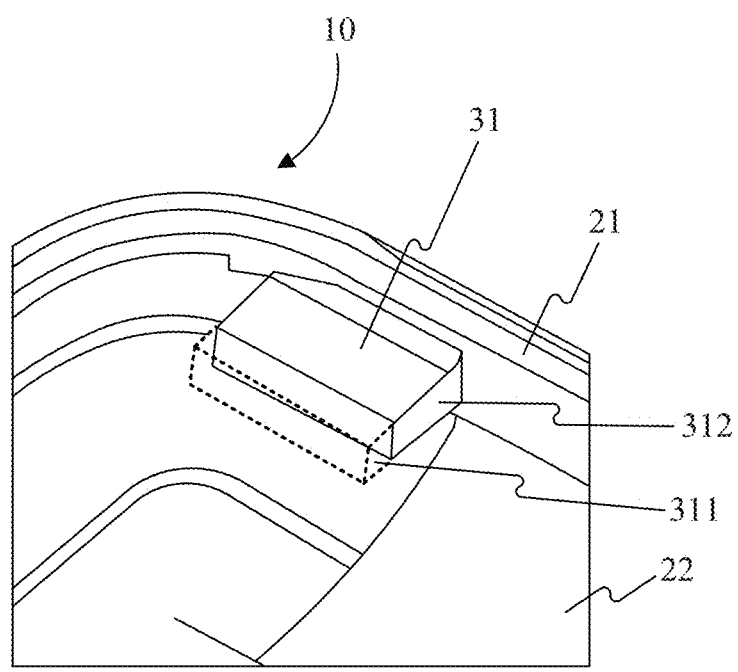
FIG. 1E is a schematic diagram illustrating a plastic gripping structure formed by the method of FIG. 1A, according to an exemplary embodiment.

FIG. 1E is a schematic diagram illustrating a plastic gripping structure created in step 103, according to an exemplary embodiment. As shown in FIG. 1E, an excessive portion 311 on a distal end of the protruding portion 31 from the side wall 21 and parallel to the bottom portion 22 may be removed from the protruding portion 31, so as to form a plastic gripping structure 312. The plastic gripping structure 312 has a preset rectangular shape. For example, the shape of the plastic gripping structure 312 may be designed according to the structure of an antenna slot that needs to be formed on the metal shell. Nevertheless, the present disclosure does not limit the specific shapes of plastic gripping structures formed in step 103.

In step 104, the plastic gripping structure is injected and filled with plastic.

Step 104 forms a plastic layer on the surface of the plastic gripping structure 312. The plastic layer insulates the metal material of the plastic gripping structure 312, thereby preventing the metal material of the plastic gripping structure 312 from interfering on the antenna or other parts of the electronic device.

In the present embodiment, the reserved material 11 is bent and shoved to form the protruding portion 31 on the side wall 21, and then the required plastic gripping structure 312 is made from the protruding portion 31. As such, CNC machines are not needed to stamp out the metal shell from the metal sheet. Moreover, the difficulty of perfuming metal stamping on the metal sheet is reduced. Accordingly, the disclosed method saves the time for fabricating the metal shell and improves the production efficiency of the metal shell. In addition, since the disclosed method does not need to use a thick metal sheet, the raw metal material can be saved and thus the cost of fabricating the metal shell is reduced.

In some embodiments, step 102 may further include: placing a position limiting device at a second position on the bottom portion of the metal shell, the second position corresponding to the set position of the reserved material on the side wall; bending and shoving the reserved material on the side wall towards the inner side of the side wall, until the protruding portion is formed on a top surface of the position limiting device; setting the protruding portion against the top surface of the position limiting device; and removing the position limiting device from the bottom portion of the metal shell.

In some embodiments, step 103 may further include: using a CNC machine to mill out a single-piece plastic gripping structure from the protruding portion, according to the preset shape of the plastic gripping structure; using a T-shaped cutter to cut the single-piece plastic gripping structure into two or more secondary plastic gripping structures; and using the T-shaped cutter to mill out a hollow structure between every two adjacent secondary plastic gripping structures.

In some embodiments, before step 103, the method 100 may further include: milling out at least one plastic gripping hole on a surface of the protruding portion, the surface being parallel to the bottom portion of the metal shell.

In some embodiments, after step 102, the method 100 may further include: milling out at least one through hole on the protruding portion.

FIG. 2 is a flowchart of a method 200 for fabricating a metal shell, according to an exemplary embodiment. The method 200 may be used in combination with the method 100 and provides a way to bend and shove the reserved material (step 102 of the method 100). Referring to FIG. 2, the method 200 may include the following steps.

In step 201, a position limiting device is placed on the bottom portion of the metal shell. The position of the position limiting device on the bottom portion corresponds to the position of the reserved material on the side wall of the metal shell.

In step 202, the reserved material on the side wall is bent and shoved towards the inner side of the side wall, until the protruding portion is formed at the inner side of the side wall.

In step 203, the protruding portion is set against the top surface of the position limiting device, such that the position and/or orientation of the protruding portion can be limited by the position limiting device. The position limiting device is removed from the bottom portion of the metal shell after the protruding portion is set.

As shown in FIGS. 1C and 1D, the height of the position limiting device may be determined according to the position of the protruding portion 31 at the inner side of the side wall 21. The present disclosure does not limit the shape of the position limiting device. For example, the position limiting device may be configured as a cuboid, and a height of the cuboid is for setting the distance between the protruding portion 31 and the bottom portion 22.

In the present embodiment, the position limiting device is used to flexibly and precisely control the position of the protruding portion 31, thereby avoiding improper positions of the protruding portion 31 resulted from a poor usage of force during the bending and shoving of the reserved material. This way, the yield of the metal-shell fabrication can be improved.

FIG. 3A is a flowchart of a method 300 for fabricating a metal shell, according to an exemplary embodiment. The method 300 may be used in combination with the method 100 and provides a way to mill the protruding portion into two or more plastic gripping structures. Referring to FIG. 3A, the method 300 may include the following steps.

In step 301, a CNC machine is used to mill out the plastic gripping structure from the protruding portion, according to the preset shape of the plastic gripping structure, the plastic gripping structure being in a single-piece structure.

Figure 3B:
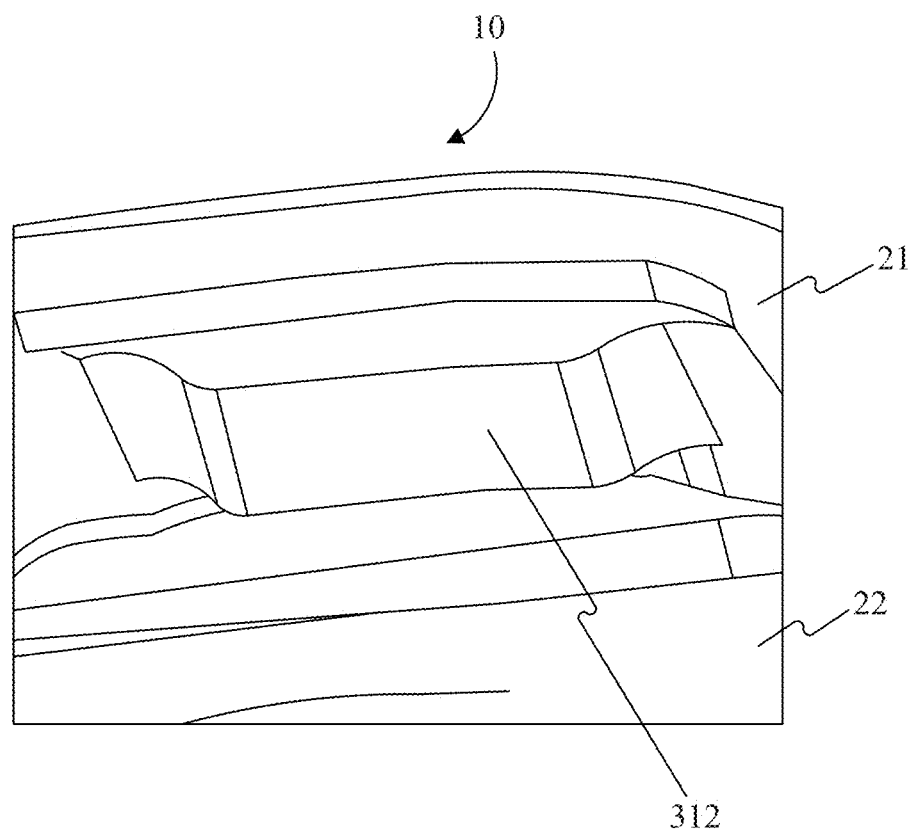
FIG. 3B is a schematic diagram illustrating a single-piece plastic gripping structure, according to an exemplary embodiment.

FIG. 3B is a schematic diagram illustrating a plastic gripping structure 312 generated in step 301, according to an exemplary embodiment. As shown in FIG. 3B, the plastic gripping structure 312 is a single-piece structure.

In step 302, a T-shaped cutter is used to cut the plastic gripping structure into two or more secondary plastic gripping structures; and to mill out a hollow structure between every two adjacent secondary plastic gripping structures.

Figure 3C:
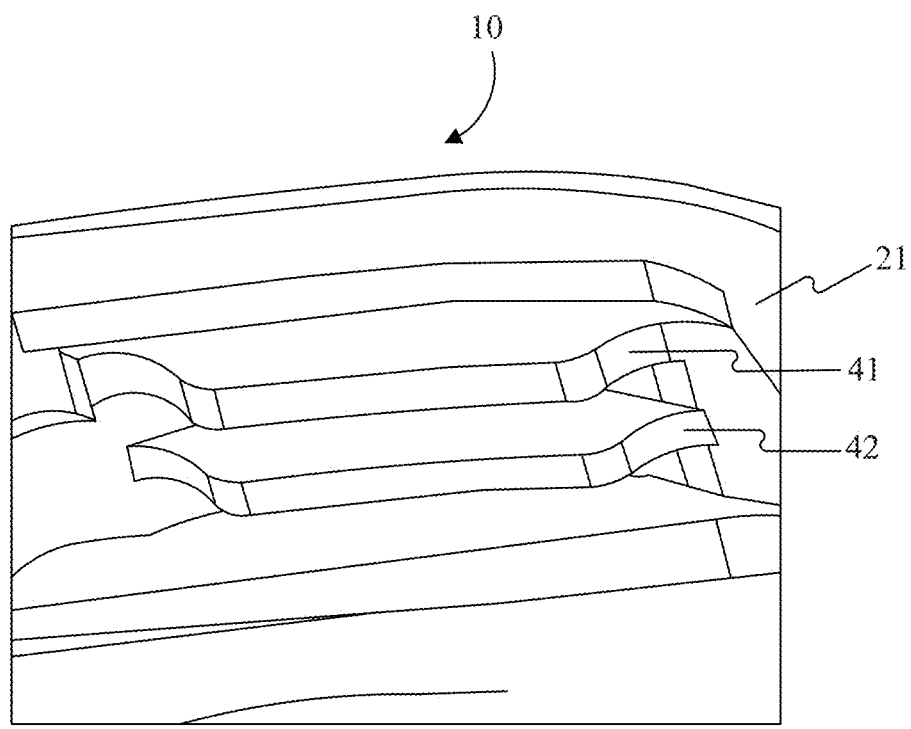
FIG. 3C is a schematic diagram illustrating two plastic gripping structures, according to an exemplary embodiment.

FIG. 3C is a schematic diagram illustrating two secondary plastic gripping structures 41 and 42 generated in step 302, according to an exemplary embodiment. As shown in FIG. 3C, a T-shaped cutter may be used to cut the single-piece plastic gripping structure 312 (shown in FIG. 3B) to form secondary plastic gripping structures 41 and 42.

Although the plastic gripping structures shown in FIGS. 3B and 3C do not have plastic gripping holes. It is contemplated that the method 300 may also be used with plastic gripping structures having plastic gripping holes. The present disclosure does not limit the specific structure or shape of the plastic gripping structures.

In the present embodiment, by cutting the single-piece plastic gripping structure into two or more secondary plastic gripping structures, the contacting area between the plastic gripping structures and the plastic can be increased in multiples, thereby improving the ability of the plastic gripping structures to grip the plastic.

Figure 4A:
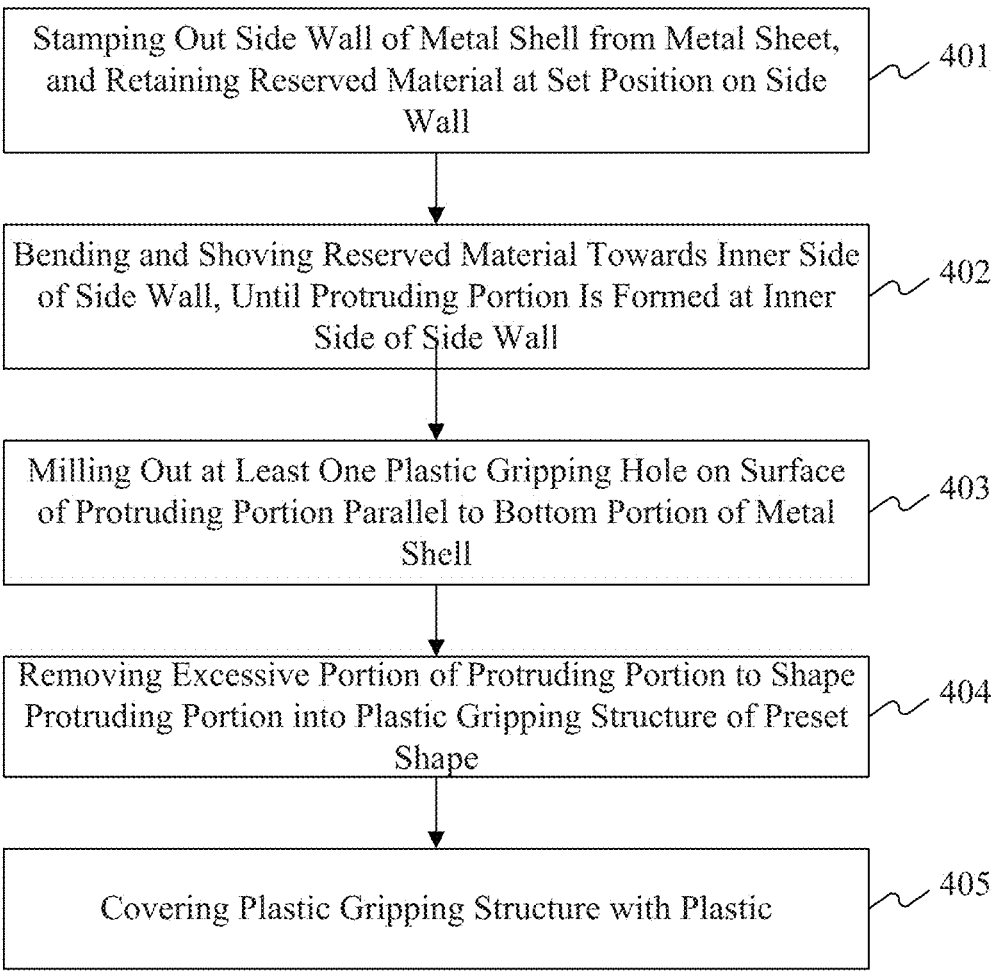
FIG. 4A is a flowchart of a method for fabricating a metal shell, according to an exemplary embodiment.

FIG. 4A is a flowchart of a method 400 for fabricating a metal shell, according to an exemplary embodiment. The method 400 provides a way to remove excessive material from a protruding portion and mill out plastic gripping holes on a plastic gripping structure. Referring to FIG. 4A, the method 400 may include the following steps.

In step 401, a side wall and a bottom portion of the metal shell are stamped out from a metal sheet, and a reserved material is retained at a first position on the side wall.

In step 402, the reserved material is bent and shoved towards an inner side of the side wall, until a protruding portion is formed at the inner side of the side wall.

Steps 401 and 402 are similar to steps 101 and 102, respectively. As such, the details of step 401 and 402 may be referred to the description related to steps 401 and 402, which will not be elaborated herein.

In step 403, at least one plastic gripping hole is milled out on a surface of the protruding portion, the surface being parallel to the bottom portion of the metal shell.

Figure 4B:
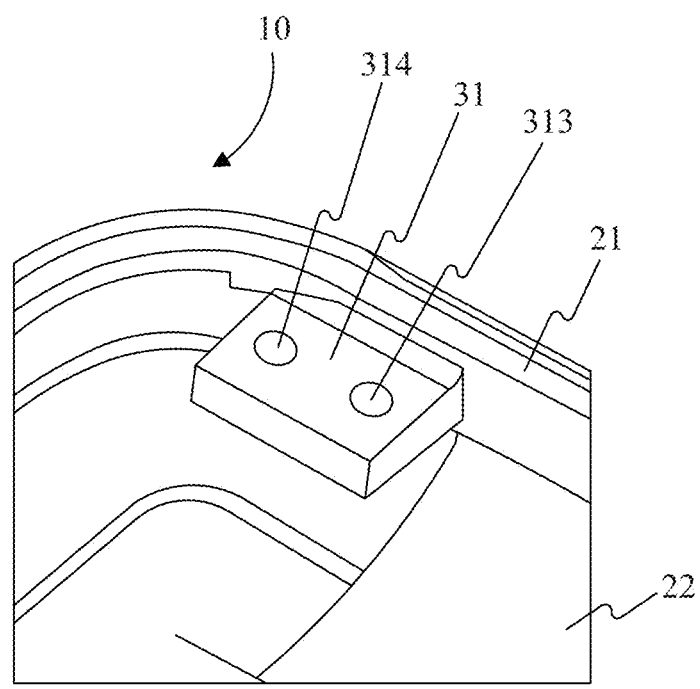
FIG. 4B is a schematic diagram illustrating a partial view of a plastic gripping structure having a plastic gripping hole, according to an exemplary embodiment.

FIG. 4B is a schematic diagram illustrating a partial view of a plastic gripping structure having plastic gripping holes, according to an exemplary embodiment. As shown in FIG. 4B, a protruding portion 31 has a surface parallel to the bottom portion 21 of the metal shell. Two plastic gripping holes 313 and 314 may be milled out on this surface. The two plastic gripping holes 313 and 314 increase the contacting area between the plastic and the plastic gripping structure 312 resulted from the protruding portion 31, thereby improving the plastic gripping ability of the plastic gripping structure 312.

Figure 4C:
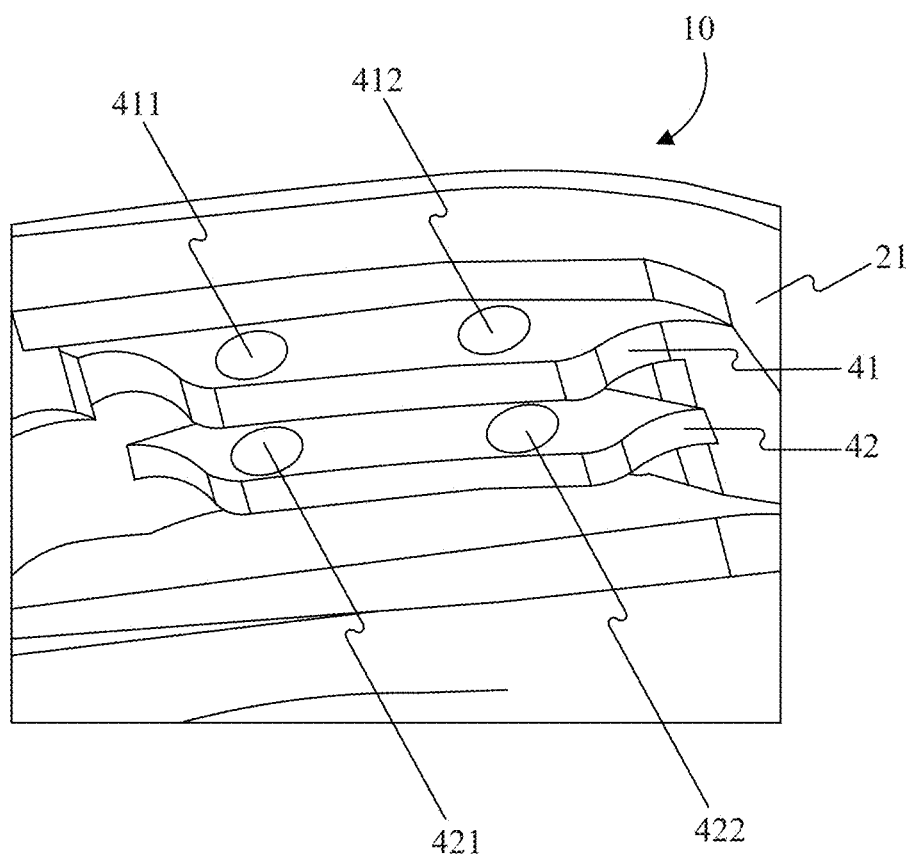
FIG. 4C is a schematic diagram illustrating a partial view of two plastic gripping structures having plastic gripping holes, according to an exemplary embodiment.

FIG. 4C is a schematic diagram illustrating a partial view of two plastic gripping structure having plastic gripping holes, according to another exemplary embodiment. As shown in FIG. 4C, two plastic gripping structures, i.e. a plastic gripping structure 41 and a plastic gripping structure 42, may be formed from the protruding portion 31 using the method 300 (FIG. 3A). A plastic gripping hole 411 and a plastic gripping hole 412 are milled out on the plastic gripping structure 41, and a plastic gripping hole 421 and a plastic gripping hole 422 are milled out on the plastic gripping structure 42.

In step 404, an excessive portion of the protruding portion is removed, to shape the protruding portion into a plastic gripping structure of a preset shape.

Because the sizes and positions of the antenna slots on different metal shells may be different, the shapes of the corresponding plastic gripping structures on the metal shells are also different. Accordingly, in step 404, excessive material on the protruding portion 31 may be removed, to form plastic gripping structures of different preset shapes. Step 404 is similar to step 103 (FIG. 1A). As such, the details of step 404 may be referred to the description relating to step 103, which will not be elaborated herein.

In step 405, the plastic gripping structure is injected and filled with plastic.

Figure 4D:
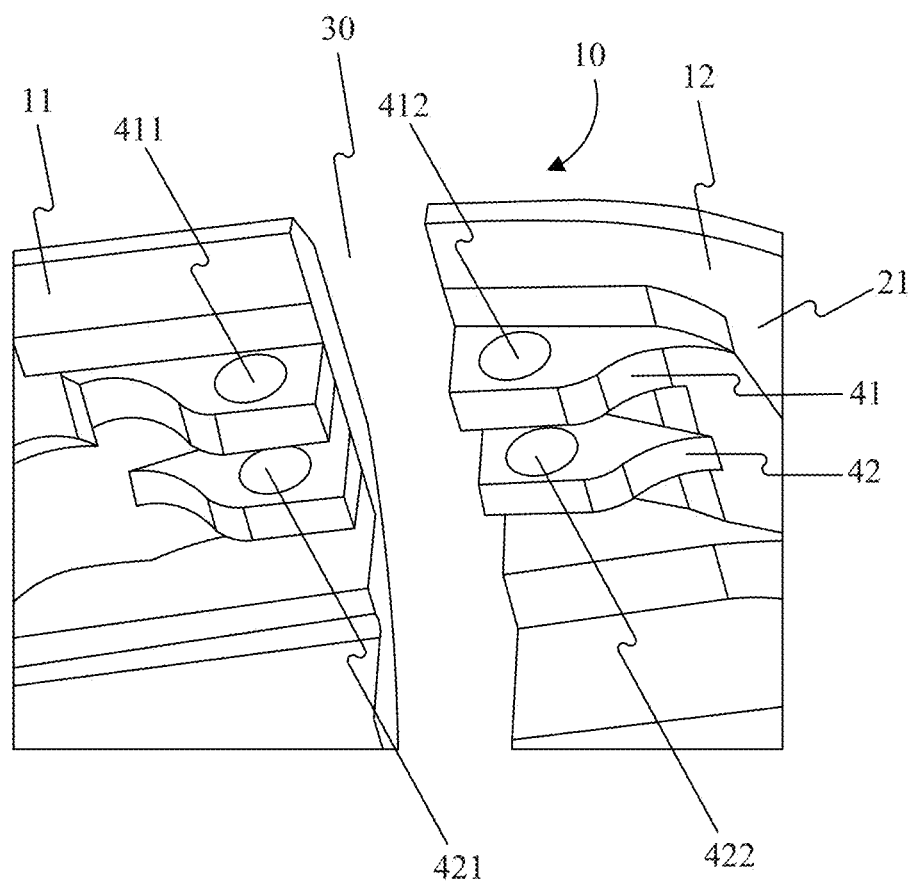
FIG. 4D is a schematic diagram illustrating a metal shell divided into a metal border and a metal main body, according to an exemplary embodiment.

FIG. 4D is a schematic diagram illustrating a metal shell divided into a metal border and a metal main body, according to an exemplary embodiment. Referring to FIG. 4D, after the plastic gripping structures 41 and 42 shown in FIG. 4C are injected and filled with plastic, the plastic gripping holes 411, 412, 421, and 422 are all filled up with plastic. Further, the metal shell may be divided into a border 11 and a main body 12. An interspace 30 between the border 11 and the main body 12 may then be filled with plastic, to affix the border 51 to the main body 52.

In an alternative embodiment, before step 401 is executed, the plastic gripping holes 313 and 314 shown in FIG. 4B may be milled out on the reserved material 11. The plastic gripping holes 313 and 314 may be formed as through holes on the reserved material 11. Similar through holes may be milled out on the reserved materials 12-14.

In exemplary embodiments, before metal stamping is performed on the metal sheet 10, the metal sheet 10 may spread in a horizontal plane and be placed on an operating station, so as to facilitate the milling out of the plastic gripping holes on the reserved material(s). This way, the complexity of forming the plastic gripping holes may be reduced.

Figure 5:
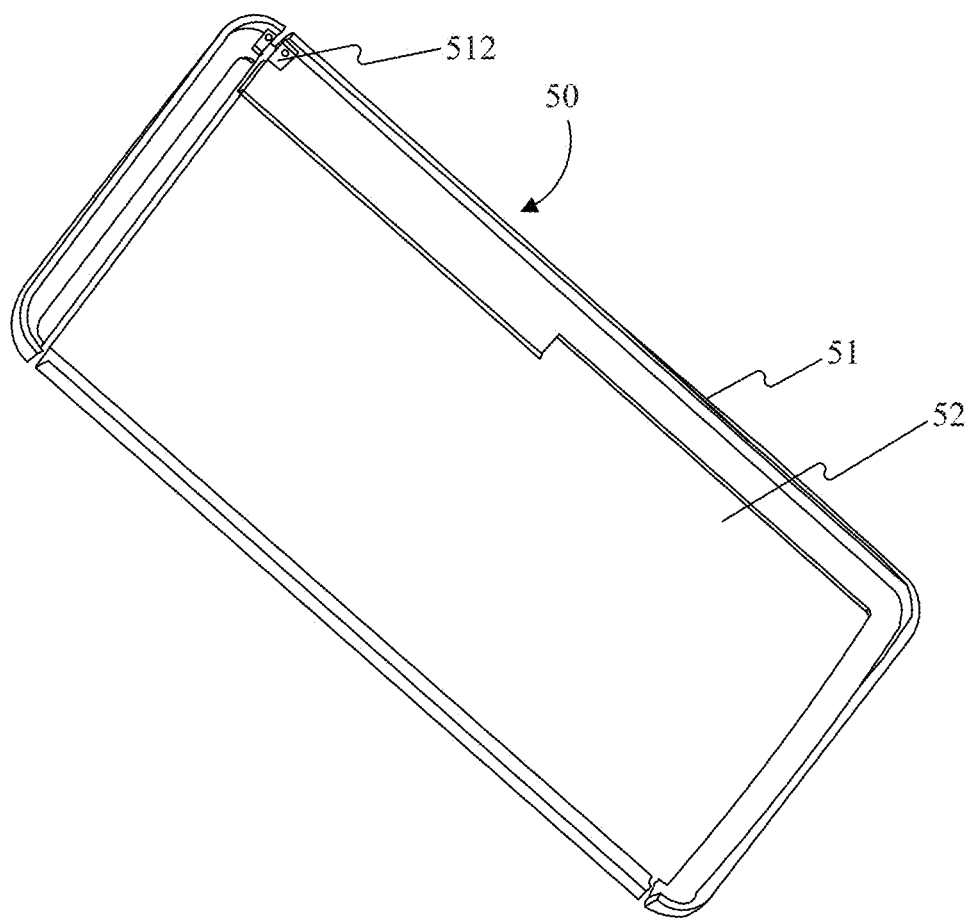
FIG. 5 is a schematic diagram illustrating of a metal shell, according to an exemplary embodiment.

FIG. 5 is a schematic diagram illustrating a metal shell 50, according to an exemplary embodiment. For example, the metal shell 50 may be fabricated according to the above-described methods. As shown in FIG. 5, the metal sheet 50 includes a side wall 51, 1 bottom portion 52, and a plastic gripping structure 512 disposed on the side wall 51.

Figure 6:
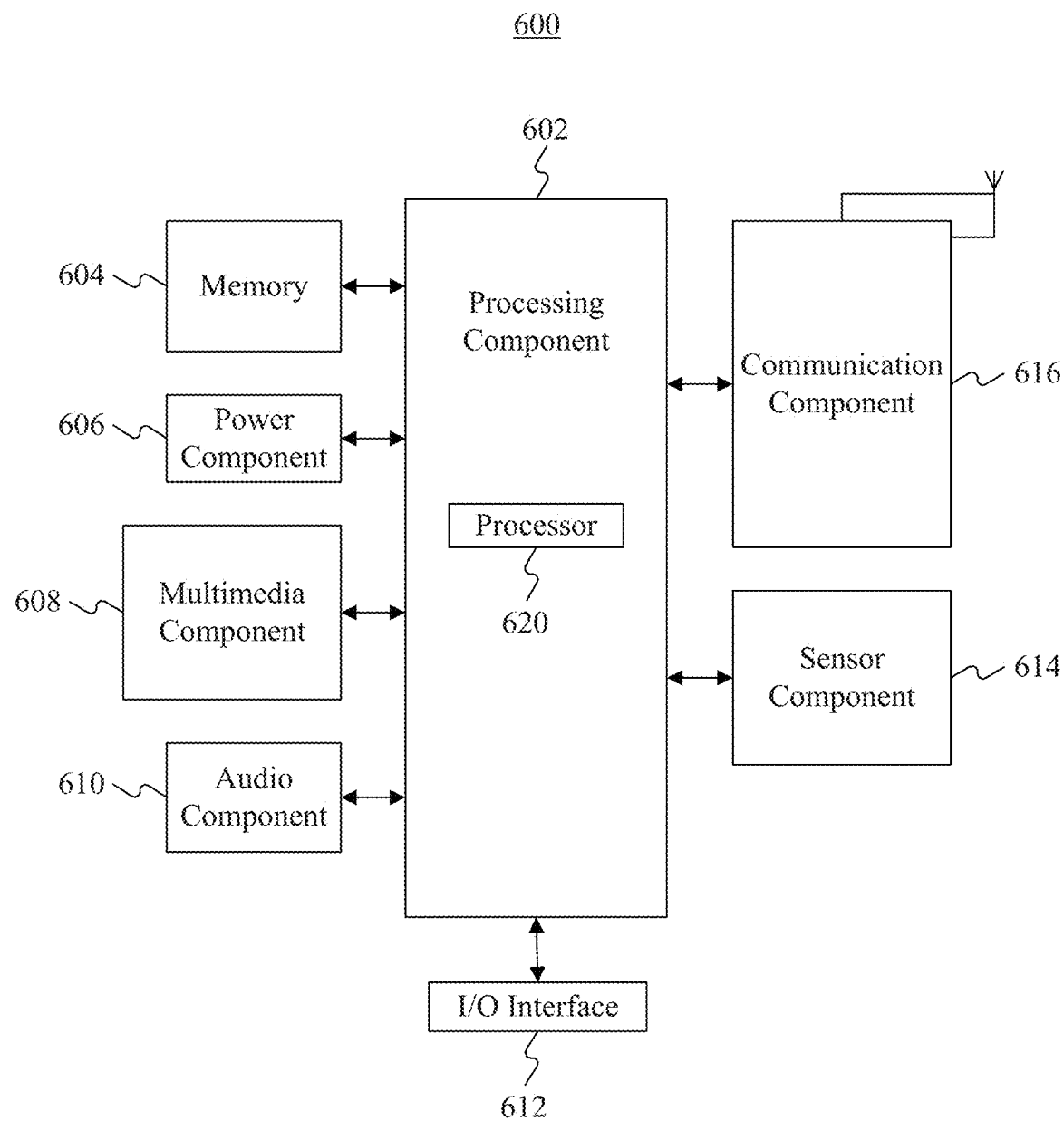
FIG. 6 is a block diagram of an electronic device, according to an exemplary embodiment.

FIG. 6 is a block diagram of an electronic device 600, according to an exemplary embodiment. For example, the electronic device 600 may be a mobile phone, a computer, a digital broadcast terminal, a messaging device, a gaming console, a tablet, a medical device, exercise device, a personal digital assistant, and the like. The electronic device 600 may have the metal shell 50 shown in FIG. 5.

Referring to FIG. 6, the electronic device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the electronic device 600, such as the operations associated with display, telephone calls, data communications, camera operations, and recording operations. The processing component 602 may include one or more processors 620 to execute instructions to perform all or some of the operations of the electronic device 600. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the electronic device 600. Examples of such data include instructions for any applications or methods operated on the electronic device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, etc.

The power component 606 provides power to various components of the electronic device 600. The power component 606 may include a power management system, one or more power sources, and any other components associated with the generation, management, and distribution of power in the electronic device 600.

The multimedia component 608 includes a screen providing an output interface between the electronic device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the electronic device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone configured to receive an external audio signal when the electronic device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the electronic device 600. For instance, the sensor component 614 may detect an open/closed status of the electronic device 600, relative positioning of components, e.g., the display and the keypad, of the electronic device 600, a change in position of the electronic device 600 or a component of the electronic device 600, a presence or absence of user contact with the electronic device 600, an orientation or an acceleration/deceleration of the electronic device 600, and a change in temperature of the electronic device 600. The sensor component 614 may include a proximity sensor configured to detect the presence of nearby objects without any physical contact. The sensor component 614 may also include a light sensor, such as a complementary metal oxide semiconductor (CMOS) or a charge coupled device (CCD) image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the electronic device 600 and other devices. The electronic device 600 can access a wireless network based on a communication standard, such as WiFi, 2G, 3G, 4G, 5G, LTE, or a combination thereof. In one exemplary embodiment, the communication component 616 receives a broadcast signal or broadcast associated information from an external broadcast management system via a broadcast channel In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth® (BT) technology, and other technologies.

In exemplary embodiments, the electronic device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for fabricating a metal shell, comprising:
   stamping out a side wall and a bottom portion of the metal shell from a metal sheet, wherein the stamping retains a reserved material at a first position on the side wall;
   bending and shoving the reserved material on the side wall towards an inner side of the side wall, until a protruding portion is formed at the inner side of the side wall;
   removing an excessive portion of the protruding portion to shape the protruding portion into a plastic gripping structure of a preset shape; and
   injecting and filling the plastic gripping structure with plastic.

2. The method of claim 1, wherein bending and shoving the reserved material on the side wall towards the inner side of the side wall, until the protruding portion is formed at the inner side of the side wall comprises:
   placing a position limiting device at a second position on the bottom portion of the metal shell, the second position corresponding to the first position on the side wall;
   bending and shoving the reserved material on the side wall towards the inner side of the side wall, until the protruding portion is formed on a top surface of the position limiting device;
   setting the protruding portion against the top surface of the position limiting device; and
   removing the position limiting device from the bottom portion of the metal shell.

3. The method of claim 1, wherein:
   the plastic gripping structure is a first plastic gripping structure; and
   removing the excessive portion of the protruding portion to shape the protruding portion into the plastic gripping structure of the preset shape comprises:
   milling out the first plastic gripping structure from the protruding portion, according to the preset shape of the first plastic gripping structure, the first plastic gripping structure being in a single-piece structure;
   cutting the first plastic gripping structure into two or more second plastic gripping structures; and
   milling out a hollow structure between at least two adjacent second plastic gripping structures.

4. The method of claim 1, further comprising:
   before the excessive portion of the protruding portion is removed to shape the protruding portion into the plastic gripping structure of the preset shape, milling out at least one plastic gripping hole on a surface of the protruding portion, the surface being parallel to the bottom portion of the metal shell.

5. The method of claim 1, further comprising:
   after the protruding portion is formed at the inner side of the side wall, milling out at least one through hole on the protruding portion.

6. The method of claim 1, further comprising:
   after the plastic gripping structure is injected and filled with plastic, dividing the metal shell into a border and a main body and filling an interspace between the border and the main body with plastic to affix the border to the main body.

7. A metal shell, comprising:
   a side wall;
   a bottom portion; and
   a plastic gripping structure of a preset shape, the plastic gripping structure being disposed on the side wall,
   wherein the plastic gripping structure is formed by a method comprising:
   stamping out the side wall and bottom portion of the metal shell from a metal sheet, wherein the stamping retains a reserved material at a first position on the side wall;
   bending and shoving the reserved material on the side wall towards an inner side of the side wall, until a protruding portion is formed at the inner side of the side wall;
   removing an excessive portion of the protruding portion to shape the protruding portion into the plastic gripping structure; and
   injecting and covering the plastic gripping structure with plastic,
   wherein bending and shoving the reserved material on the side wall towards the inner side of the side wall, until the protruding portion is formed at the inner side of the side wall comprises:
   placing a position limiting device at a second position on the bottom portion of the metal shell, the second position corresponding to the first position on the side wall;
   bending and shoving the reserved material on the side wall towards the inner side of the side wall, until the protruding portion is formed on a top surface of the position limiting device;

setting the protruding portion against the top surface of the position limiting device; and removing the position limiting device from the bottom portion of the metal shell.

8. The metal shell of claim 7, wherein:

the plastic gripping structure is a first plastic gripping structure; and removing the excessive portion of the protruding portion to shape the protruding portion into the plastic gripping structure of the preset shape comprises:

milling out the first plastic gripping structure from the protruding portion, according to the preset shape of the first plastic gripping structure, the first plastic gripping structure being in a single-piece structure; and cutting the first plastic gripping structure into two or more second plastic gripping structures; and milling out a hollow structure between at least two adjacent second plastic gripping structures.

9. The metal shell of claim 7, wherein the method further comprises:

before the excessive portion of the protruding portion is removed to shape the protruding portion into the plastic gripping structure of the preset shape, milling out at least one plastic gripping hole on a surface of the protruding portion, the surface being parallel to the bottom portion of the metal shell.

10. The metal shell of claim 7, wherein the method further comprises:

after the protruding portion is formed at the inner side of the side wall, milling out at least one through hole on the protruding portion.

11. The metal shell of claim 7, wherein the method further comprises:

after the plastic gripping structure is covered with plastic, dividing the metal shell into a border and a main body, and filling an interspace between the border and the main body with plastic to affix the border to the main body.

12. The metal shell of claim 7, wherein:

the metal shell further comprises a slot;

the first position of the reserved material on the side wall is determined by a position of the slot on the metal shell; and the reserved material is:

sized to overlay the slot, and extended along the side wall in a direction parallel to the bottom portion of the metal shell.

13. An electronic device, comprising:

a processor;

a memory for storing instructions executable by the processor; and a metal shell configured to house the processor and memory, the metal shell comprising:

a side wall;

a bottom portion; and a plastic gripping structure of a preset shape, the plastic gripping structure being disposed on the side wall, wherein the plastic gripping structure is formed by a method comprising:

stamping out the side wall and bottom portion of the metal shell from a metal sheet, wherein the stamping retains a reserved material at a first position on the side wall;

bending and shoving the reserved material on the side wall towards an inner side of the side wall, until a protruding portion is formed at the inner side of the side wall;

removing an excessive portion of the protruding portion to shape the protruding portion into the plastic gripping structure; and covering the plastic gripping structure with plastic, wherein bending and shoving the reserved material on the side wall towards the inner side of the side wall, until the protruding portion is formed at the inner side of the side wall comprises:

placing a position limiting device at a second position on the bottom portion of the metal shell, the second position corresponding to the first position on the side wall;

bending and shoving the reserved material on the side wall towards the inner side of the side wall, until the protruding portion is formed on a top surface of the position limiting device;

setting the protruding portion against the top surface of the position limiting device; and removing the position limiting device from the bottom portion of the metal shell.

14. The electronic device of claim 13, wherein:

the plastic gripping structure is a first plastic gripping structure; and removing the excessive portion of the protruding portion to shape the protruding portion into the plastic gripping structure of the preset shape comprises:

milling out the first plastic gripping structure from the protruding portion, according to the preset shape of the first plastic gripping structure, the first plastic gripping structure being in a single-piece structure; and cutting the first plastic gripping structure into two or more second plastic gripping structures; and milling out a hollow structure between at least two adjacent second plastic gripping structures.

15. The electronic device of claim 13, wherein the method further comprises:

before the excessive portion of the protruding portion is removed to shape the protruding portion into the plastic gripping structure of the preset shape, milling out at least one plastic gripping hole on a surface of the protruding portion, the surface being parallel to the bottom portion of the metal shell.

16. The electronic device of claim 13, wherein the method further comprises:

after the protruding portion is formed at the inner side of the side wall, milling out at least one through hole on the protruding portion.

17. The electronic device of claim 13, wherein the method further comprises:

after the plastic gripping structure is injected and filled with plastic, dividing the metal shell into a border and a main body, and filling an interspace between the border and the main body with plastic to affix the border to the main body.

18. The electronic device of claim 13, wherein:

the metal shell further comprises a slot;

the first position of the reserved material on the side wall is determined by a position of the slot on the metal shell; and the reserved material is:

sized to overlay the slot, and extended along the side wall in a direction parallel to the bottom portion of the metal shell.

* * * * *